United States Patent [19]

Shimizu

[11] Patent Number: 5,049,911
[45] Date of Patent: Sep. 17, 1991

[54] DEVICE FOR INDICATING A REMAINING QUANTITY OF RECORDABLE PARTS OF A RECORDING MATERIAL IN A CAMERA

[75] Inventor: Hitoshi Shimizu, Tokyo, Japan

[73] Assignee: Asahi Kogaku Kogyo Kabushiki Kaisha, Tokyo, Japan

[21] Appl. No.: 418,272

[22] Filed: Oct. 6, 1989

[30] Foreign Application Priority Data

Oct. 7, 1988 [JP] Japan ................................. 63-253241

[51] Int. Cl.$^5$ .............................................. G03B 1/18
[52] U.S. Cl. .................................... 354/217; 352/170
[58] Field of Search ........................ 358/335, 906, 909; 360/33.1, 35.1; 352/170, 171; 354/217, 218, 21

[56] References Cited

U.S. PATENT DOCUMENTS

| | | | |
|---|---|---|---|
| 3,776,625 | 12/1973 | Fountain | 352/170 |
| 4,021,828 | 5/1977 | Iura et al. | 354/217 |
| 4,561,741 | 12/1985 | Ishizaka et al. | 354/21 |
| 4,579,432 | 4/1986 | Kobayashi | 354/21 |
| 4,619,511 | 10/1986 | Goto et al. | 354/217 |
| 4,693,574 | 9/1987 | Ohnuki et al. | 354/21 |
| 4,858,031 | 8/1989 | Fukuta | 358/906 |
| 4,888,605 | 12/1989 | Matsumoto | 354/217 |

FOREIGN PATENT DOCUMENTS 909488 10/1962 United Kingdom .
988107 4/1965 United Kingdom .
8103228 11/1981 World Int. Prop. O. .

Primary Examiner—Brian W. Brown
Assistant Examiner—Khanh Dang
Attorney, Agent, or Firm—Sandler, Greenblum & Bernstein

[57] ABSTRACT

A device for indicating a remaining quantity of the recordable portion of a recording material, such as a magnetic disk or film. The indicating device comprises a counting device which counts a remaining recordable quantity of recording material, and a warning device which outputs a warning when the reamining recordable quantity is low. The warning device is provided with an acoustic alarm device for outputting a vocal or electronic sound corresponding to the remaining quantity or an optical alarm device for outputting light indicating the value of the remaining recordable portions, or corresponding to the remaining quantity. The optical alarm mechanism is provided in such a manner that the warning light can be observed in the viewfinder of the camera.

11 Claims, 4 Drawing Sheets

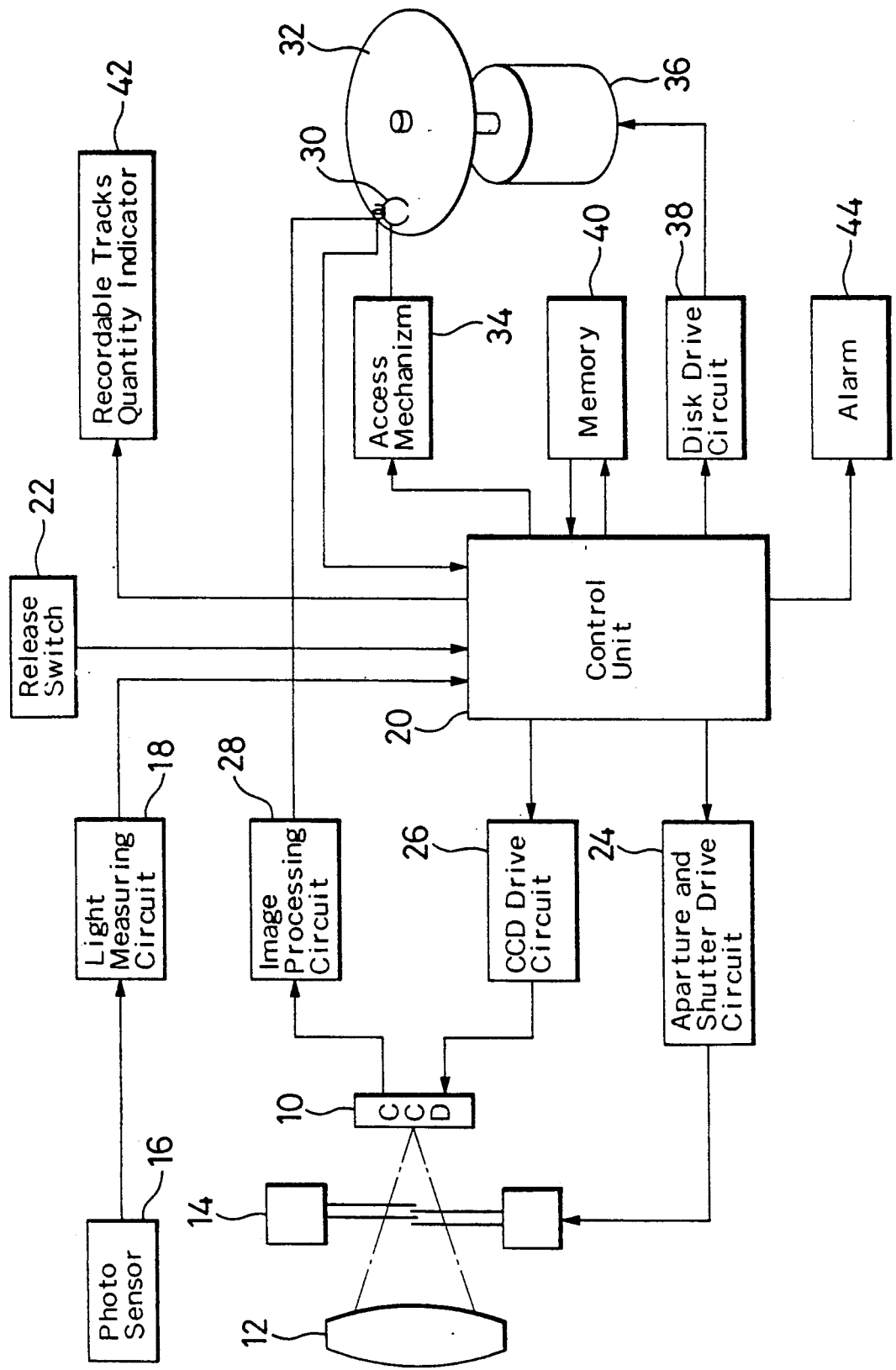
F I G. 1

DEVICE FOR INDICATING A REMAINING QUANTITY OF RECORDABLE PARTS OF A RECORDING MATERIAL IN A CAMERA

BACKGROUND OF THE INVENTION

1. Field of the Invention

The present invention relates to a device for indicating the remaining quantity of the recordable portion of recording material mounted in a camera.

2. Description of the Related Art

In a conventional still video camera, an object image is formed at an imaging device which changes the object image signal to a video signal; and the video signal is then recorded on a magnetic disk. This magnetic disk has 50 tracks, for example, and is used in a still camera provided with either a field recording system in which one image is recorded on one track, or with a frame recording system in which one image is recorded on two tracks. In other words, one magnetic disk can image 25 images (photographs) with the frame recording system, and 50 images with the field recording system.

According to a conventional method of indicating the number of recordable parts that can be used in the still camera described above, when a magnetic disk is mounted in the camera, the recorded condition of the tracks is read by a magnetic head, so that the remaining number of recordable tracks is indicated as a numerical value such as "50" or "25" by an indicator. The indicator is provided on a camera body in such a manner that the numerical value can be read by a photographer only when not looking through the view finder of the camera.

It should be noted that, in the case of a still video camera, a magnetic disk can be freely inserted and removed during use, different from the usual camera using a film. Therefore, the magnetic disk is often removed from the camera, and a partially used magnetic disk is often inserted in the camera. Also, in some cases, the first track of the magnetic disk is not used, and further, some tracks are intentionally skipped to make blank tracks.

In the above cases in the prior art, the photographer can not tell whether the magnetic disk is unused or partly used, without observing the indicator; nor can be determined whether or not the magnetic disk includes blank tracks located general midway among the total number of tracks. Further, to determine the number of remaining tracks (the number of tracks used or the number of tracks not used) while photographing, the photographer must observe the indicator provided on the camera body during or after each operation of the camera.

Accordingly, if the attention of the photographer is concentrated on the view finder while photographing, the photographer will not be aware of how many usable tracks remain, and thus may not change the magnetic disk at the right time, and accordingly, may miss the opportunity to take a desired photograph.

Further, even if the number of remaining tracks is the same, the displayed number of tracks is different in the field mode and the frame mode. For example, because only the remaining number of tracks is indicated by a conventional system, the number of recordable tracks may be incorrect if the frame mode is selected.

In a still camera using film as the recording material, the number of frames remaining is indicated by an indicator provided on an outer surface of the camera body; and, therefore, in this case also, if the attention of the photographer is concentrated on the viewfinder of the camera, the photographer may not notice that the number of remaining frames is low, and thus may miss an opportunity to take a desired photograph.

Moreover, in a conventional system, since only the number of frames used is indicated, although film having 24 frames is actually mounted in the camera, the photographer may have forgotten this and thinks that film having 36 frames has been mounted in the camera; in such a case, he will thus be convinced that another 12 frames remain to be used when "24" is indicated at the indicator.

SUMMARY OF THE INVENTION

Therefore, the object of the present invention is to provide an indicating device by which the number of remaining recordable portions of recording material, e.g., frames are determined without the need to look at an indicator provided on an outer surface of the camera body.

According to the present invention, the indicating device comprises means for sensing a remaining quantity of the recordable portion of recording material, and means for issuing a warning when the remaining quantity of the recordable portion of the recording material becomes less than a predetermined value.

BRIEF DESCRIPTION OF THE DRAWINGS

The present invention will be better understood from the description of the preferred embodiments of the invention set forth below, together with the accompanying drawings, in which:

FIG. 1 is a block diagram of an embodiment of a still video camera to which an indicating device in accordance with the present invention is applied;

DESCRIPTION OF THE PREFERRED EMBODIMENTS

Figure 2:
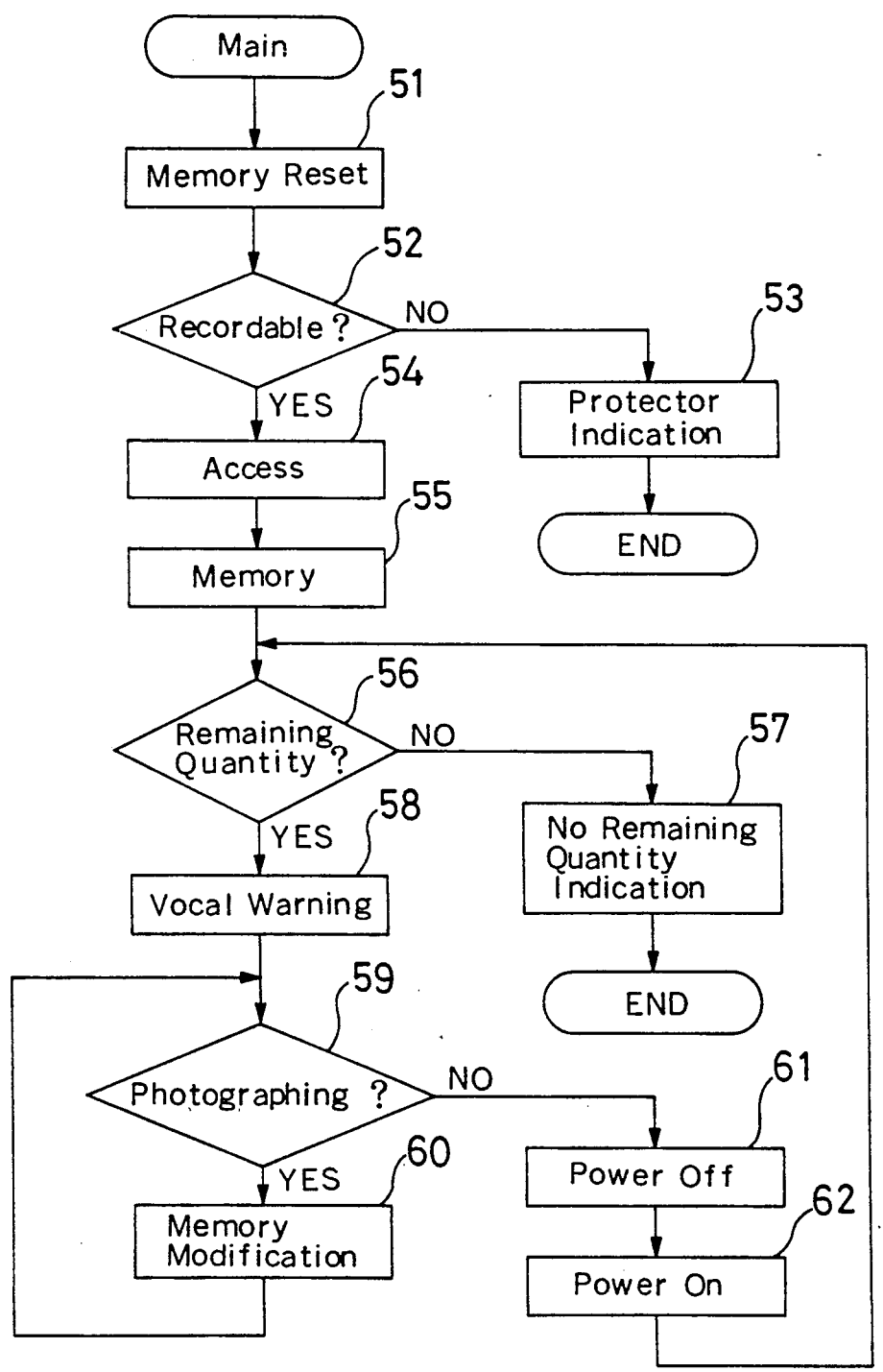
FIG. 2 is a first flow chart showing an operation of the indicating device of the embodiment.

The present invention will now be described with reference to embodiments shown in the drawings. FIG. 1 is a block diagram showing a main part of one embodiment of a still video camera to which the present invention is applied. This embodiment is applied to a lens shutter type still video camera using a magnetic disk as a recording material or medium.

A CCD imaging device 10, which is provided for forming an image, is disposed along a focal plane of a photographing lens 12, which is a photographing optical system. An aperture and shutter unit 14 having aperture blades and shutter blades is provided between the CCD imaging device 10 and the photographing lens 12.

A photosensor 16 adapted to accept object light is provided on a plane in front of a camera, and an output (an object luminance signal) of the photo sensor 16 is logarithmically compressed by a light measuring circuit 18 and then converted to a digital signal to be input to a control unit (CPU) 20.

The control unit 20 carries out an AE calculation to obtain an aperture value (Av) and a shutter speed (Tv), and when a release switch 22 is turned ON, the control unit 20 drives the aperture and shutter unit 14 through an aperture and shutter drive circuit 24, in accordance with the Av value and the Tv value. Note that the control unit 20 is provided with a function by which system control is carried out for the operation of the whole camera, in addition to the AE calculation and the drive for the aperture and shutter unit 14.

When an object image is formed on the CCD imaging device 10 by an operation of the aperture and shutter unit 14, an electric charge is accumulated on each picture element of the CCD imaging device 10. The control unit 20 controls the accumulation of the electric charge on each picture element of the CCD imaging device 10 through a CCD drive circuit 26, and outputs the accumulated electric charge to the image processing circuit 28 as an object image signal.

The object image signal is subjected to several processes and converted to a compound color image signal, and is given a frequency modulation to be recorded on a predetermined track of a magnetic disk 32 by a magnetic head 30. The system of this embodiment has a frame mode and a field mode both of which are well known, as recording methods, wherein one image is recorded on one track in the frame mode and on two tracks in the field mode, as mentioned above.

In addition to a recording function, the magnetic head 30 has the function of detecting whether or not a track has been used, and the detection signal is input to the control unit 20. The magnetic head 30 is tracked by an access mechanism 34.

The magnetic disk 32 is rotatively driven by a drive motor 36, which is driven by a disk drive circuit 38 driven and controlled by the control unit 20.

The control unit 20 is provided with a memory 40, which is a counter for memorizing the number of recordable tracks of the magnetic disk 32, a recordable track quantity indicator 42 for indicating the number of recordable tracks, and an alarm 44 for warning a photographer that the number of recordable tracks is less than a predetermined value.

The memory 40 memorizes the number of recordable tracks detected by the magnetic head 30, through access to the magnetic disk 32, and every time a photograph is taken (i.e., every time an image signal is recorded on the magnetic disk 32), the number of recordable tracks is decreased by one and the result of this subtraction is memorized by the memory 40.

The recordable tracks quantity indicator 42 is provided in a viewfinder of the camera, and includes a two-digit, 7-segment LCD for indicating the number of recordable tracks as a numerical value. Further, the indicator 42 blinks on and off when the number of recordable tracks becomes less than a predetermined value; namely, the indicator 42 also functions as an optical warning means. Note, when the indicator 42 operates as the optical warning means, the indicator 42 may exhibit a different color than when the indicator 42 indicates the number of recordable tracks.

The alarm 44 has an acoustic device, which operates when the number of recordable tracks becomes less than a predetermined value to vocally inform the photographer that the residual quantity is low. This warning may be a sound (an electronic sound) or a voice (a composite sound).

The memory 40, the recordable tracks quantity indicator 42, and the alarm 44, are an controlled and driven by the control unit 20. The control unit 20 is provided with the calculation, drive, and control functions as described above, with a control function for the overall function of each kind of camera. Namely, in the present invention, the control unit 20 is a microcomputer for carrying out operations and indicating the remaining quantity of recordable tracks.

The operation of the control unit 20 for giving the warning and indicating the remaining quantity of recordable tracks, according to the present invention, is described below with reference to the flow chart shown in FIG. 2.

When the magnetic disk 32 is mounted in the camera, first the memory 40 for storing remaining quantity of recordable tracks is first reset in Step 51; and the process then goes to Step 52.

In Step 52, it is determined whether or not the magnetic disk 32 is recordable, i.e., whether the protective claw provided at the magnetic disk 32 is set to a recordable position or to a non-recordable position. If the protective claw is set to the non-recordable position, the process goes to Step 53. Conversely, if the protective claw is set to the recordable position, the process goes to Step 54. Although the protective claw is not shown in the drawings, it is a known type of element which comprises a slidable tab on the surface of the disk (e.g., in a recess). The position of the claw can be slidably changed, such that if it is set to one position, the disk can be recorded, and if it is set to a second position, it cannot be recorded. In this fashion, a user can protect data recorded on the disk by positioning the claw to a second position.

In Step 53, the recordable tracks quantity indicator 42 indicates that the protective claw is set, and the process then goes to the END of the operation.

In Step 54, the magnetic head 30 is made to access the magnetic disk 32, to search the magnetic disk 32 from the outermost peripheral track to the innermost peripheral track, and is stopped at a first unused track detected by the magnetic head 30; and the process then goes to Step 55.

In Step 55, the number of recorded tracks detected by the access described above is written into the memory 40, and the process goes to Step 56.

In step 56, based on the value stored in the memory 40, the remaining quantity of recordable tracks, i.e., the number of unused tracks, which is the value obtained by subtracting the stored value from "50", i.e., the number of tracks on the disk, is determined. If the remaining quantity is less than a predetermined value, the process goes to Step 57. Conversely, if the remaining quantity is higher than the predetermined value, the process goes to Step 58.

In Step 57, an indication showing that there are no remaining recordable tracks, i.e., an indication "E", blinks on and off, for example, when indicated at the recordable tracks quantity, indicator 42, and the END operation is then carried out.

In Step 58, the alarm 44 warns the photographer vocally, for example, of the number of recordable tracks, by announcing "There are 10 recordable tracks remaining". This information may be an electronic sound, however; and in such a case, a plurality of different sounds corresponding to the number of recordable tracks are preferably emitted.

In Step 59, it is determined whether or not a photographing operation is carried out. Note, this photographing operation involves turning ON the release switch 22, opening and closing the aperture and shutter unit 14, exposing the CCD imaging device 10 to light, and writing to the magnetic disk 32. If the photographing operation has been carried out, in Step 60, the content of the memory 40 is incremented by 1 in the case of the field mode, and by 2 in the case of the frame mode, and the process then returns to Step 59.

Steps 61 and 62 are processes in which a power-off process or a power-on process is carried out. If a predetermined period has passed without operation of the camera after a power switch (not shown) is turned ON, the power supply is shut off, and if the battery (not shown) charge is low, the power-off process is carried out in Step 61. If the power switch is turned ON, the predetermined period has not passed, and the battery charge is sufficient, the power-on process is carried out in Step 62, and the process returns to Step 56.

Figure 3:
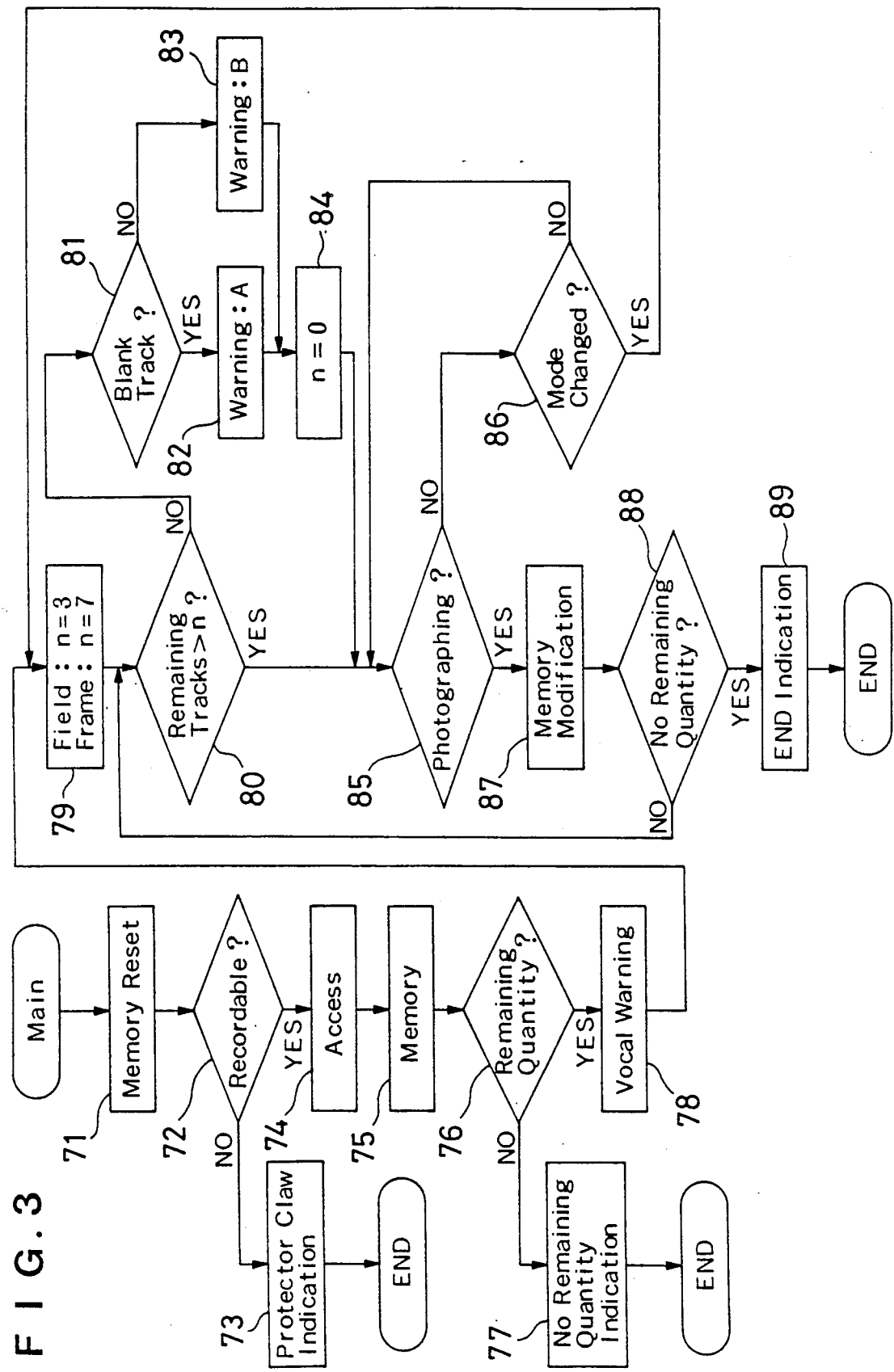
FIG. 3 is a second flow chart showing another operation of the indication device of the embodiment.

An operation of a second embodiment of the control unit 20, for indicating the remaining quantity of recordable tracks, is described below with reference to the flow chart shown in FIG. 3.

When the magnetic disk 32 is mounted in the camera, first the memory 40 is reset in Step 71, and the process then goes to Step 72.

In Step 72, it is determined whether or not the magnetic disk 32 is recordable, i.e., whether the protective claw is set to a recordable position or to a non-recordable position. If the protective claw is set to non-recordable position, the process goes to Step 73. Conversely, if the the protective claw is set to the recordable position, the process goes to Step 74.

In Step 73, the recordable tracks quantity indicator 42 indicates that the protective claw has been set, and the process then goes to the END operation and is stopped.

In Step 74, the magnetic head 30 is made to access the magnetic disk 32 to search the magnetic disk 32 from the outermost peripheral track towards the innermost peripheral track, and is and stopped at a first unused track detected by the magnetic head 30 and the process then goes to Step 75.

In Step 75, the number of recorded tracks obtained by the access described above is written into the memory 40, and the process goes to Step 76.

In Step 76, based on the value stored in the memory 40, the remaining quantity of recordable tracks is determined, i.e., it is determined whether or not there are any unused tracks. If there are no unused tracks, the process goes to Step 77, but if unused tracks are found, the process goes to Step 78.

In Step 77, an indication that there are no unused tracks remaining is indicated at the track residual quantity indicator 42, and then the END operation is carried out.

In Step 78, the alarm 44 is driven to acoustically warn the photographer that there are recordable tracks remaining, and the process then goes to Step 79.

In Step 79, the critical number of recordable tracks "n" at which a warning is given is set to, e.g., "3" in the case of the field mode, and to "7", e.g., in the case of the frame mode, and then the process goes to Step 80.

In Step 80, it is determined whether or not the number of recordable tracks stored in the memory is larger than "n". If the remaining number is less than "n", the process goes to Step 81. Conversely, if the remaining number is more than "n", the process goes to Step 85.

In Step 81, it is determined whether or not there is a blank track at the outer periphery of the stop position of the magnetic head 30. If a blank track exists there, the process goes to Step 82, and if there is no blank track, the process goes to Step 83. Note that a recording operation is carried out from the outermost peripheral track towards the inner peripheral track, in sequence, and the memory 40 also stores data showing whether or not 50 tracks have been recorded on each disk.

In Step 82, an alarm "A" warning that a blank track exists is given, or an alarm "B" warning that there is no blank track is given, and the process goes to Step 84. The alarm "A" is given vocally as, for example, "Three frames remain for photographing." "There are n blank tracks on the outer peripheral portion.", or as an electronic sound, e.g., "pee, pee, . . . ". The alarm "B" is given as, for example, "Three frames remain for photographing." "There are no blank tracks on the outer peripheral portion." vocally, or "bee, bee, . . . " by an electronic sound. The alarms "A" and "B" are distinguished as described above, whereby the photographer can tell whether or not there are blank tracks on a previous part (i.e., outer periphery) of the disk.

In Step 84, the number of recordable tracks "n" is set to "0", and the process goes to Step 85.

In Step 85, it is determined whether or not a photographing operation has been carried out. If the photographing operation has been carried out, the process goes to Step 87, and if the photographing operation has not been carried out, the process goes to Step 86.

In Step 86, it is determined whether or not a photographing mode has been changed. If the photographing mode has not been changed, the process returns to Step 85. Conversely, if the photographing mode has been changed, the process returns to Step 79.

In Step 87, the content of the memory 40 is modified. Namely, if a photographing operation has been carried out in the field mode, "2" is subtracted from "n", and if the photographing operation has been carried out in the frame mode, "1" is subtracted from "n", and the result is stored in the memory 40. Then the process goes to Step 88.

In Step 88, it is determined whether or not there are any remaining recordable tracks. In this step, if recordable tracks are found, the process returns to Step 80. If no recordable tracks are found, the process goes to Step 89 to carry out an END indication by the recordable tracks quantity indicator 42 (indicator 88 blinks on and off, for example), and thus an END operation is carried out.

According to the above embodiment, when the remaining quantity of recordable tracks becomes low, a warning is given to announce the remaining quantity of recordable tracks, vocally and by blinking on-and-off the light at the recordable tracks quantity indicator 42, and, thus, the photographer is clearly made aware of the remaining quantity of recordable tracks.

Further, since the vocal and on-and-off light indications are changed in accordance with the number of remaining recordable tracks, even if photographing is carried out in a frame mode in which the number of recordable tracks is different from that in the field mode, the number of recordable tracks is clearly shown.

Still further, the number of remaining recordable tracks may be considered not as a number, but as a quantity, and thus may be indicated visually or vocally as, for example, "N percent of the recordable material remains".

Note that, although the recordable tracks quantity indicator 42 and the alarm 44 are both provided as warning mechanisms in this embodiment, only one thereof can be used in the present invention.

Figure 4:
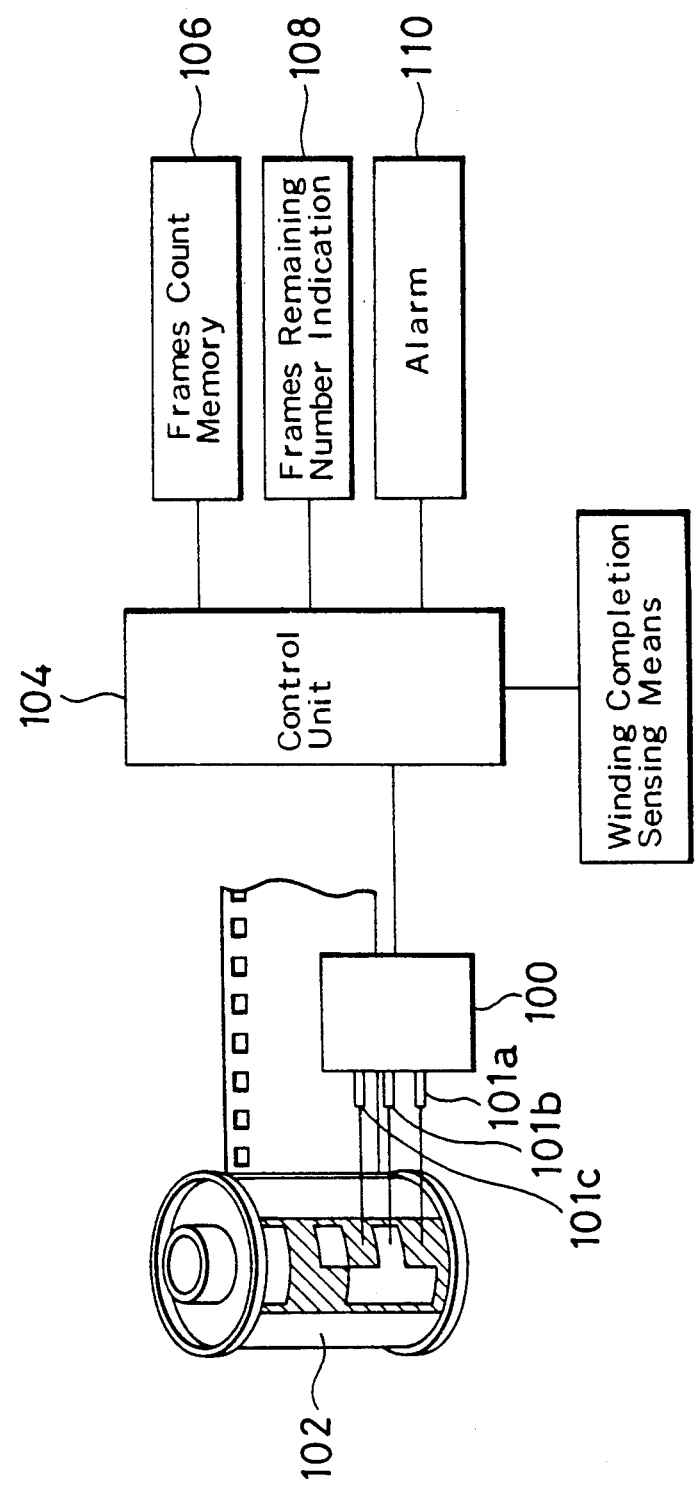
FIG. 4 is a block diagram showing another embodiment in which the indicating device of the present invention is applied to a still camera using film.

Although embodiments in which the present invention is applied to a still video camera are described above, the present invention can be also applied to a still camera using film. The main parts of an embodiment applying the present invention to a still camera using film are shown in FIG. 4.

This type of camera is provided with a DX code reading device 100 which reads a DX code on the film to determine the number of photographable frames. The DX code reading device 100 has three conduction pins 101a, 101b, and 101c, which come into contact with a DX code provided on a surface of a film cartridge 102. Note that, although the DX code includes information about the ISO sensitivity and latitude of the film, these are unnecessary for an understanding of the present invention, and therefore, an explanation thereof is omitted.

The Dx code read by the DX code reading device 100 is input to the control unit 104, wherein the DX code is decoded and the corresponding number of frames is stored in a film count memory 106, which is a counter. Thereafter, each time the shutter is released and one frame of the film is wound, the control unit 104 receives a winding completion signal from switch sensing a completion of a film winding operation, and decrements the value stored in the film count memory 106 by 1.

The control unit 104 is connected to a frames remaining number indicator 108 and an alarm 110 for outputting an acoustic warning. The frames remaining number indicator 108 is provided within a visual field of a view finder of the camera, and numerically indicates a frames remaining number. The alarm 110 has the same construction as the alarm 44 of the still video camera described above.

The frames remaining number indicator 108 and the alarm 110 are controlled by the control unit 104 so that the frames remaining number indicator 108 indicates the frame count value stored in the memory 106, and the alarm 110 outputs a warning when the frames remaining number becomes less than a predetermined value. Namely, when the stored value in the frame count memory 106 becomes low, for example, 3, the control unit 104 causes the frames remaining number indicator 108 to blink on and off, and the alarm 110 to output a warning sound, to warn the photographer that the remaining number of photographable frames is low. This on-and-off operation of the light, and the emission of a warning sound, enables the photographer to clearly recognize that the number of usable frames is low, for example, that the number is less than 3.

The above warning may be given vocally, as for the still video camera described above, as long as the photographer, while looking through the view finder, is made visually or vocally aware that the number of recordable tracks is low, or as in the case of a conventional device, is made aware of the number of tracks or frames used.

As described above, according to the present invention, even if the attention of the photographer is concentrated on the view finder of the camera, the photographer can be clearly and simply warned that the quantity of recordable material remaining is low, and thus can make a timely change of the recording material.

Although the embodiments of the present invention have been described herein with reference to the accompanying drawings, obviously many modifications and changes may be made by those skilled in this art without departing from the scope of the invention.

I claim:

1. A device for indicating a remaining quantity of recordable tracks of a magnetic disk mounted in a still video camera, said magnetic disk having tracks for recording an electric signal thereon corresponding to an object image formed by an imaging device of said still video camera, said indicating device comprising;

means for sensing the remaining number of recordable tracks on said magnetic disk, said sensing means comprises means for sensing unrecorded tracks existing at a point midway between outer and inner peripheries of said magnetic disk; and means for giving a warning when said remaining number of recordable tracks on said magnetic disk becomes less than a predetermined value, said warning means including means for counting the remaining number of recordable tracks on said magnetic disk.

2. An indicating device according to claim 1, wherein said warning means comprises an acoustic warning means for emitting a sound warning relating to said remaining number of recordable tracks.

3. An indicating device according to claim 2, wherein said warning means comprises means for outputting a plurality of different sounds corresponding to said remaining number of the recordable tracks of said magnetic disk.

4. An indicating device according to claim 1, wherein said warning means comprises an optical warning means for giving a visual warning relating to said remaining number of recordable tracks.

5. An indicating device according to claim 4, wherein said optical warning means comprises means for providing a symbol corresponding to said remaining number of recordable tracks of said magnetic disk.

6. An indicating device according to claim 4, wherein said optical warning means comprises means for providing a number corresponding to said remaining number of recordable tracks of said magnetic disk.

7. An indicating device according to claim 4, wherein said optical warning means comprises means for providing a colored light corresponding to said remaining number of recordable tracks of said magnetic disk.

8. An indicating device according to claim 4, wherein said optical warning means comprises means for providing an optical indication in a view finder of said camera.

9. An indicating device according to claim 6, wherein said optical warning means comprises a light emitting element provided in said view finder.

10. An indicating device according to claim 1, wherein said counting means comprises means for counting the number of recorded tracks of said magnetic disk after each executed photographing operation.

11. An indicating device according to claim 1, wherein said warning means comprises means for emitting a warning of the existence of said unrecorded tracks existing at said midway point, and the number of said unrecorded tracks.

* * * * *

UNITED STATES PATENT AND TRADEMARK OFFICE
CERTIFICATE OF CORRECTION

PATENT NO. : 5,049,911
DATED : September 17, 1991
INVENTOR(S) : Hitoshi SHIMIZU

It is certified that error appears in the above-indentified patent and that said Letters Patent is hereby corrected as shown below:

On the cover page, at item [57], line 6 under ABSTRACT, change "reamining" to ---remaining---.

Signed and Sealed this

Twenty-first Day of February, 1995

Attest:

BRUCE LEHMAN

Attesting Officer    Commissioner of Patents and Trademarks